(12) United States Patent
Hatanaka et al.

(10) Patent No.: US 11,326,010 B2
(45) Date of Patent: May 10, 2022

(54) AGENT FOR DISPERSING ELECTRICALLY CONDUCTIVE CARBON MATERIAL, AND DISPERSION OF ELECTRICALLY CONDUCTIVE CARBON MATERIAL

(71) Applicant: NISSAN CHEMICAL INDUSTRIES, LTD., Tokyo (JP)

(72) Inventors: Tatsuya Hatanaka, Funabashi (JP); Yuki Shibano, Funabashi (JP); Takuji Yoshimoto, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 520 days.

(21) Appl. No.: 16/359,621

(22) Filed: Mar. 20, 2019

(65) Prior Publication Data

US 2019/0218326 A1 Jul. 18, 2019

Related U.S. Application Data

(62) Division of application No. 14/915,087, filed as application No. PCT/JP2014/072165 on Aug. 25, 2014, now abandoned.

(30) Foreign Application Priority Data

Aug. 27, 2013 (JP) ................. 2013-175652

(51) Int. Cl.

| | |
|---|---|
| *C08F 226/06* | (2006.01) |
| *C08K 7/24* | (2006.01) |
| *C08L 33/02* | (2006.01) |
| *C08L 101/02* | (2006.01) |
| *C08L 101/06* | (2006.01) |
| *C08L 101/14* | (2006.01) |
| *C09D 5/24* | (2006.01) |
| *C09D 105/04* | (2006.01) |
| *C09D 133/02* | (2006.01) |
| *C09D 139/04* | (2006.01) |
| *H01B 1/24* | (2006.01) |
| *H01G 11/32* | (2013.01) |
| *H01G 11/68* | (2013.01) |

(Continued)

(52) U.S. Cl.
CPC .............. *C08F 226/06* (2013.01); *C08K 7/24* (2013.01); *C08L 33/02* (2013.01); *C08L 101/025* (2013.01); *C08L 101/06* (2013.01); *C08L 101/14* (2013.01); *C09D 5/24* (2013.01); *C09D 105/04* (2013.01); *C09D 133/02* (2013.01); *C09D 139/04* (2013.01); *H01B 1/24* (2013.01); *H01G 11/32* (2013.01); *H01G 11/68* (2013.01); *H01M 4/622* (2013.01); *H01M 4/663* (2013.01); *H01M 4/667* (2013.01)

(58) Field of Classification Search
CPC ......... C08F 226/06; C08K 7/24; C08L 33/02; C08L 101/025; C08L 101/06; C08L 101/14; C09D 5/24; C09D 105/04; C09D 133/02; C09D 139/04; H01B 1/24; H01G 11/32; H01G 11/68; H01M 4/622; H01M 4/663; H01M 4/667
USPC ........................................................ 429/245
See application file for complete search history.

(56) References Cited

U.S. PATENT DOCUMENTS

| | | |
|---|---|---|
| 5,300,602 A | 4/1994 | Arita et al. |
| 6,340,562 B1 | 1/2002 | Taima |
| 6,576,341 B1 | 6/2003 | Davey et al. |

(Continued)

FOREIGN PATENT DOCUMENTS

| | | |
|---|---|---|
| CN | 101233630 A | 7/2008 |
| JP | 9-97625 A | 4/1997 |

(Continued)

OTHER PUBLICATIONS

WO 2012-133030 A1—machine translation (Year: 2012).*

(Continued)

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

Provided is an agent for dispersing an electrically conductive carbon material, in which the agent consists of a polymer which has an oxazoline group in a side chain and which is obtained by using an oxazoline group-containing monomer such as that represented by formula (1) for example, and in which the agent exhibits excellent dispersion of an electrically conductive carbon material and produces a thin film that exhibits excellent adhesion to a current collection substrate when formed into a thin film together with the electrically conductive carbon material.

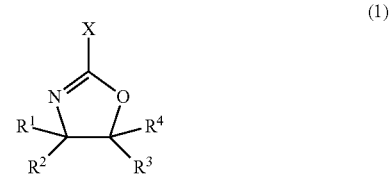

(1)

(In the formula, X denotes a polymerizable carbon-carbon double bond-containing group, and $R^1$-$R^4$ each independently denote a hydrogen atom, a halogen atom, an alkyl group optionally having a branched structure having 1-5 carbon atoms, an aryl group having 6-20 carbon atoms, or an aralkyl group having 7-20 carbon atoms.)

20 Claims, 1 Drawing Sheet

(51) Int. Cl.
  *H01M 4/62* (2006.01)
  *H01M 4/66* (2006.01)

(56) References Cited

U.S. PATENT DOCUMENTS

| | | | |
|---|---|---|---|
| 7,682,590 | B2 | 3/2010 | Sakakibara et al. |
| 2006/0235144 | A1 | 10/2006 | Hwang et al. |
| 2009/0181309 | A1 | 7/2009 | Kwon et al. |
| 2009/0305132 | A1 | 12/2009 | Gauthier et al. |

FOREIGN PATENT DOCUMENTS

| | | | |
|---|---|---|---|
| JP | 10-316907 A | 12/1998 | |
| JP | 11-149916 A | 6/1999 | |
| JP | 2000-11991 A | 1/2000 | |
| JP | 2000-44216 A | 2/2000 | |
| JP | 2002-121302 A | 4/2002 | |
| JP | 2005-162877 A | 6/2005 | |
| JP | 2006-294615 A | 10/2006 | |
| JP | 2009-170410 A | 7/2009 | |
| JP | 2013-127959 A | 6/2013 | |
| JP | 2013-211108 A | 10/2013 | |
| JP | 2014-199804 A | 10/2014 | |
| WO | WO 2008/139839 A1 | 11/2008 | |
| WO | WO 2012/133030 A1 | 10/2012 | |
| WO | WO-2012133030 A1 * | 10/2012 | ............. H01M 4/62 |
| WO | WO 2014/171415 A1 | 10/2014 | |

OTHER PUBLICATIONS

Chinese Office Action and Chinese Search Report, dated Sep. 19, 2016, for Chinese Application No. 201480047238.8.
International Search Report, issued in PCT/JP2014/072165 PCT/ISA/210, dated Nov. 25, 2014.
Office Action dated Jun. 6, 2017, in Japanese Patent Application No. 201480047238.8.
Written Opinion of the International Searching Authority, issued in PCT/JP2014/072165 PCT/ISA/237, dated Nov. 25, 2014.
Yang Huaming (2007) Industrial Functional Materials, Chemical Industry Press, pp. 275-276 (with Statement of the Relevance).

* cited by examiner

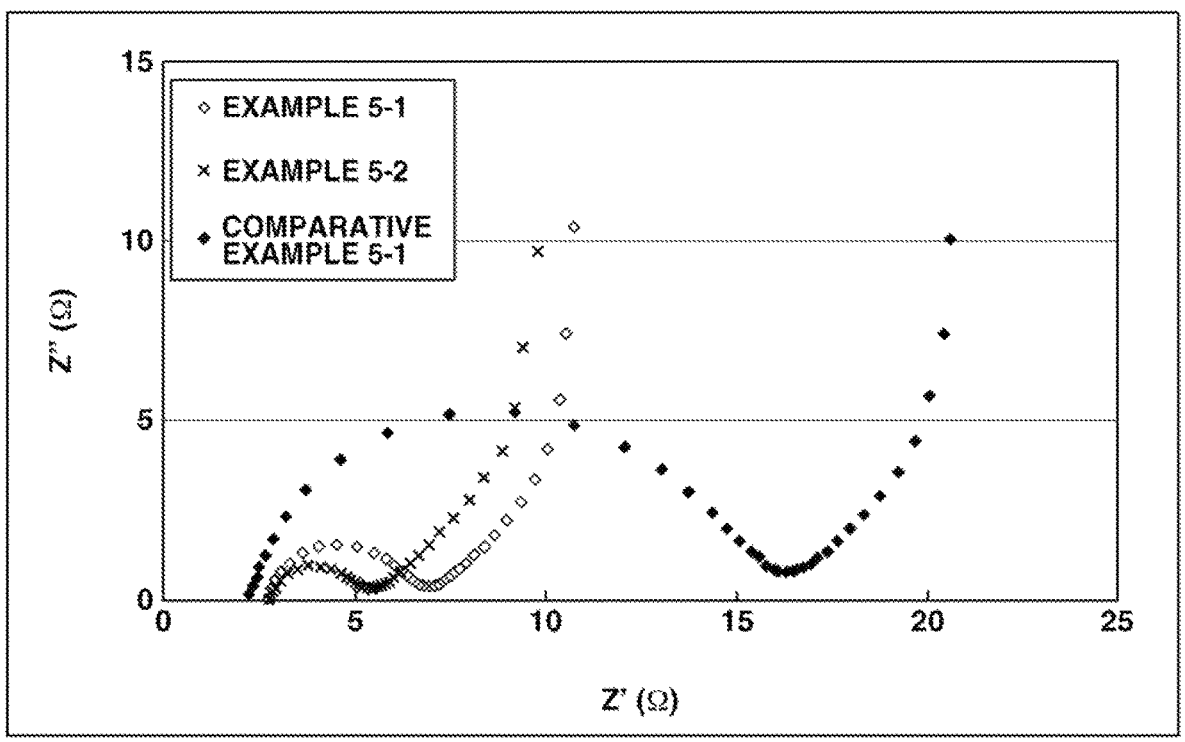

AGENT FOR DISPERSING ELECTRICALLY CONDUCTIVE CARBON MATERIAL, AND DISPERSION OF ELECTRICALLY CONDUCTIVE CARBON MATERIAL

CROSS-REFERENCE TO RELATED APPLICATIONS

This application is a Divisional of co-pending U.S. application Ser. No. 14/915,087 filed on Feb. 26, 2016, which is a National Phase of PCT International Application No. PCT/JP2014/072165 filed on Aug. 25, 2014, which claims the benefit under 35 U.S.C. § 119(a) to Patent Application No. 2013-175652, filed in Japan on Aug. 27, 2013, all of which are hereby expressly incorporated by reference into the present application.

TECHNICAL FIELD

This invention relates to an agent for dispersing an electrically conductive carbon material, and to a dispersion of an electrically conductive carbon material. More specifically, the invention relates to a conductive carbon material-dispersing agent consisting of a polymer having pendant oxazoline rings, and to a conductive carbon material dispersion which contains this dispersing agent, an electrically conductive carbon material and a solvent and which is suitable for use as a conductive thin film-forming composition.

BACKGROUND ART

With the need for smaller size, lower weight and higher functionality in portable electronic devices such as smart phones, digital cameras and handheld game consoles, active progress has been made recently in the development of high-performance batteries and demand for secondary batteries, which can be repeatedly used by charging, is growing rapidly.

Lithium ion secondary batteries in particular, because of their high energy density and high voltage, and also because they lack a memory effect during charging and discharging, are the secondary batteries currently undergoing the most vigorous advances in development.

In addition, as part of recent efforts to tackle environmental problems, electrical vehicles are also under active development, and higher performance has come to be desired of the secondary batteries that serve as the power source for such vehicles.

Lithium ion secondary batteries have a structure in which a container houses a positive electrode and a negative electrode capable of intercalating and deintercalating lithium and a separator interposed between the electrodes, and is filled with an electrolyte solution (in the case of lithium ion polymer secondary batteries, a gel-like or completely solid electrolyte instead of a liquid electrolyte solution).

The positive electrode and negative electrode are generally formed by coating a composition which includes an active material capable of intercalating and deintercalating lithium, an electrically conductive material consisting primarily of a carbon material and a polymer binder onto a current collector such as copper foil or aluminum foil. The binder is used to bond the active material with the conductive material, and also to bond these with the metal foil. Commercially available binders of this type include, for example, N-methylpyrrolidone (NMP)-soluble fluoropolymers such as polyvinylidene fluoride (PVdF), and aqueous dispersions of olefin polymers.

As noted above, lithium ion secondary batteries also show promise as a power source for electric vehicles and the like, and so there is a desire that such batteries have a longer life and better safety than has hitherto been achieved.

However, the bonding strength of the above binders to the current collector is less than adequate. During production operations such as electrode plate cutting steps and winding steps, some of the active material and conductive material separates from the current collector and falls off, causing micro-shorting and variability in the battery capacity.

In addition, with long-term use, due to swelling of the binder on account of the electrolyte solution or to changes in the volume of the electrode mixture associated with volume changes resulting from lithium intercalation and deintercalation by the active material, the contact resistance between the electrode mixture and the current collector increases or some of the active material or conductive material separates from the current collector and falls off, leading to a deterioration in the battery capacity and leading also to problems from the standpoint of safety.

In particular, advances have been made recently in the development of active materials which, in positive electrode systems, are solid solution systems and, in negative electrode systems, are alloy systems of silicon or the like. These active materials have a larger charge/discharge capacity than pre-existing active materials, and thus experience a larger change in volume with charging and discharging. As a result, the separation or peeling of such electrode mixtures from the current collector is a problem in urgent need of a solution.

Techniques that involve inserting an electrically conductive bonding layer between the current collector and the electrode mixture have been developed as attempts to solve the above problems.

For example, Patent Document 1 discloses the art of disposing, as a bonding layer between the current collector and the electrode mixture, a conductive layer containing carbon as a conductive filler. This publication indicates that, by using a conductive bonding layer-containing composite current collector (also referred to below simply as a "composite current collector"), the contact resistance between the current collector and the electrode mixture can be decreased, loss of capacity during high-speed discharge can be suppressed, and deterioration of the battery can be minimized. Similar art is disclosed also in Patent Documents 2 and 3.

In these examples, carbon particles are used as the conductive filler, but because carbon particles do not have a bonding action with respect to the current collector, a bonding layer is created using a polymer that serves as a matrix. Of course, the bonding strength rises as the polymer content becomes larger. On the other hand, as the polymer content increases, contact between the carbon particles decreases, and so the resistance of the bonding layer rises abruptly. As a result, the resistance of the battery as a whole rises.

To solve such problems, examples have been reported in which an electrically conductive carbon nanomaterial such as carbon nanotubes (abbreviated below as "CNTs") is used as the conductive filler.

For example, Patent Document 4 reports the use of multi-walled carbon nanotubes (abbreviated below as "MWCNTs") as the conductive carbon nanomaterial to form a conductive bonding layer on aluminum foil, thereby making it possible to increase the cycle life of lithium ion secondary batteries. However, in Patent Document 4, because the dispersing agent used when forming the MWCNT-containing conductive bonding layer has a low carbon nanotube dispersibility, it has been necessary to carry out spray coating a plurality of times in order to obtain a layer of sufficient thickness.

In order to form a film by a CNT coating process, it is generally necessary to uniformly disperse CNTs in a solvent. Examples of such dispersing techniques include techniques which involve surface modifying CNTs by a chemical process (Patent Document 5), and techniques which involve the concomitant use of a dispersing agent such as a polymer (Patent Documents 6 and 7). Of these, techniques involving the concomitant use of a dispersing agent do not worsen the excellent electrical properties of CNTs, and so may be regarded as a preferred approach in cases where the CNTs are used as a conductive filler.

However, a drawback of dispersing agents capable of dispersing CNTs to a high concentration is that they have a low adhesion to the current collectors used in secondary batteries. To obtain a bonding layer having excellent conductivity, it is necessary to add a polymer or the like having the ability to adhere to the current collector. A problem in such cases is that the CNT concentration within the conductive binder layer decreases, as a result of which the conductivity of the layer declines.

In light of the above, there has existed a desire for the development of an agent for dispersing electrically conductive carbon materials, which dispersing agent not only has an excellent ability to disperse electrically conductive carbon materials such as carbon nanotubes, but also, when rendered into a thin-film, has an excellent adhesion to a current collector.

PRIOR ART DOCUMENTS

Patent Documents

Patent Document 1: JP-A H09-097625
Patent Document 2: JP-A 2000-011991
Patent Document 3: JP-A H11-149916
Patent Document 4: JP-A 2009-170410
Patent Document 5: JP-A 2000-44216
Patent Document 6: JP-A 2005-162877
Patent Document 7: WO 2008/139839

SUMMARY OF THE INVENTION

Problems to be Solved by the Invention

It is therefore an object of the invention to provide an agent for dispersing an electrically conductive carbon material, which agent has an excellent ability to disperse a conductive carbon material such as carbon nanotubes and, moreover, when rendered into a thin film together with a conductive carbon material, is able to give a thin-film having excellent adhesion to a current-collecting substrate. A further object is to provide an electrically conductive carbon material dispersion which includes this dispersing agent, a conductive carbon material and a solvent.

Means for Solving the Problems

The inventors have conducted extensive investigations in order to achieve the above objects. As a result, they have discovered that polymers with pendant oxazoline groups have an excellent ability to disperse electrically conductive carbon materials such as carbon nanotubes, and that a thin-film obtained from an electrically conductive carbon material dispersion prepared using such a polymer as the dispersing agent has an excellent adhesion to the current-collecting substrate of an energy storage device electrode and thus is well-suited for use as an electrically conductive bonding layer.

Accordingly, the invention provides:

1. An agent for dispersing an electrically conductive carbon material, the agent consisting of a polymer having a pendant oxazoline group;
2. The conductive carbon material-dispersing agent of 1 above, wherein the polymer is water soluble;
3. The conductive carbon material-dispersing agent of 2 above, wherein the polymer is obtained by radical-polymerizing at least two monomers: an oxazoline monomer having a polymerizable carbon-carbon double bond-containing group at position 2, and a (meth)acrylic monomer having a hydrophilic functional group;
4. A dispersion of an electrically conductive carbon material, characterized by comprising the conductive carbon material-dispersing agent of any one of 1 to 3 above, an electrically conductive carbon material and a solvent, wherein the conductive carbon material is dispersed in the solvent;
5. The conductive carbon material dispersion of 4 above, wherein the solvent is water;
6. The conductive carbon material dispersion of 4 or 5 above, further comprising a crosslinking agent;
7. The conductive carbon material dispersion of any one of 4 to 6 above, further comprising a matrix polymer;
8. An electrically conductive thin-film-forming composition comprising the conductive carbon material dispersion of any one of 4 to 7 above;
9. An electrically conductive thin-film obtained from the conductive thin film-forming composition of 8 above;
10. The conductive thin-film of 9 above for use as an electrically conductive bonding layer that is interposed between, and bonds together, a current-collecting substrate which make up an energy storage device electrode and an active material layer;
11. A composite current collector for an energy storage device electrode, comprising a current-collecting substrate and, formed on the substrate, an electrically conductive bonding layer consisting of the conductive thin-film of 9 above;
12. An electrode for an energy storage device, comprising the composite current collector for an energy storage device electrode of 11 above;
13. The energy storage device electrode of 12 above, comprising the composite current collector for an energy storage device electrode of 11 above and, formed on the conductive bonding layer of the composite current collector, an active material layer;
14. An energy storage device comprising the energy storage device electrode of 12 or 13 above;
15. A thin-film obtained from the conductive carbon material dispersion of any one of 4 to 7 above;
16. A method for dispersing an electrically conductive carbon material by using an electrically conductive carbon material-dispersing agent to disperse an electrically conductive carbon material in a solvent, the method being characterized in that the conductive carbon material-dispersing agent is a polymer having a pendant oxazoline group; and
17. A method for producing an electrically conductive carbon material dispersion by using an electrically conductive carbon material-dispersing agent to disperse an electrically conductive carbon material in a solvent, the method being characterized by carrying out dispersion treatment on a mixture obtained by mixing together an electrically conductive carbon material-dispersing agent consisting of a polymer having a pendant oxazoline group, an electrically conductive carbon material and a solvent.

Advantageous Effects of the Invention

The inventive agent for dispersing an electrically conductive carbon material not only has an excellent ability to disperse electrically conductive carbon materials such as carbon nanotubes, carbon black and graphene, it also has a high adhesion to metal current-conducting substrates used in electrodes for energy storage devices such as lithium ion secondary batteries and electrical double-layer capacitors.

Conductive carbon material dispersions prepared using the electrically conductive carbon material-dispersing agent of the invention are suitable as conductive thin-film-forming compositions for forming a conductive bonding layer that bonds together the current-collecting substrate and active material which make up the electrode of an energy storage device.

That is, by using the electrically conductive carbon material dispersion of the invention, an electrically conductive thin-film having excellent adhesion to the current-collecting substrate can be formed without using another adhesive polymer, thus enabling the formation of a conductive thin-film which contains a high concentration of carbon nanotubes and has excellent adhesion to the current-collecting substrate. This means that the electrical resistance of the conductive bonding layer can be lowered, making it possible, particularly in applications such as electrical vehicle applications where a large current is instantaneously required, to draw off current without causing a voltage drop. At the same time, this enables the production of secondary batteries having a long cycle life.

The conductive carbon material dispersion of the invention, because it readily forms a thin-film merely by being coated onto a substrate and the resulting thin-film exhibits a high electrical conductivity, is suitable for the production of conductive thin-films. Moreover, in addition to giving, as noted above, a thin-film having excellent adhesion to the substrate, it is able to reproducibly and efficiently form a large-surface area thin-film by a wet method, making it highly suitable for use in not only energy storage device applications, but also in a broad range of applications as various types of semiconductor materials and electrically conductive materials.

BRIEF DESCRIPTION OF THE DIAGRAMS

FIG. 1 is a graph showing the impedance measurement results for electrical double-layer capacitors fabricated in Examples 5-1 and 5-2 and Comparative Example 5-1.

EMBODIMENT FOR CARRYING OUT THE INVENTION

The invention is described more fully below.
The conductive carbon material-dispersing agent of the invention consists of a polymer having a pendant oxazoline group.

In the invention, the "polymer having a pendant oxazoline group" (referred to below as "oxazoline polymer") is not particularly limited, so long as it is a polymer in which oxazoline groups are bonded directly or through a spacer group such as an alkylene group to repeating units making up the main chain. However, a polymer which is obtained by the radical polymerization of an oxazoline monomer of formula (1) having a polymerizable carbon-carbon double bond-containing group at position 2, and which has repeating units bonded at position 2 of the oxazoline ring to the polymer main chain or to spacer groups, is preferred.

[Chemical Formula 1]

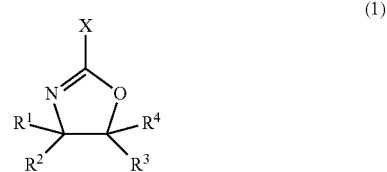

In the formula, X is a polymerizable carbon-carbon double bond-containing group, $R^1$ to $R^4$ are each independently a hydrogen atom, a halogen atom, an alkyl group of 1 to 5 carbon atoms which may have a branched structure, an aryl group of 6 to 20 carbon atoms or an aralkyl group of 7 to 20 carbon atoms.

The polymerizable carbon-carbon double bond-containing group on the oxazoline monomer is not particularly limited, provided it includes a polymerizable carbon-carbon double bond. However, an acyclic hydrocarbon group containing a polymerizable carbon-carbon double bond is desirable, with alkenyl groups having from 2 to 8 carbon atoms, such as vinyl, allyl and isopropenyl groups being preferred.

Examples of halogen atoms include fluorine, chlorine, bromine and iodine atoms.

Examples of alkyl groups of 1 to 5 carbons which may have a branched structure include methyl, ethyl, n-propyl, isopropyl, n-butyl, sec-butyl, tert-butyl and n-pentyl groups.

Examples of aryl groups of 6 to 20 carbons include phenyl, xylyl, tolyl, biphenyl and naphthyl groups.

Examples of aralkyl groups of 7 to 20 carbons include benzyl, phenylethyl and phenylcyclohexyl groups.

Illustrative examples of oxazoline monomers of formula (1) having a polymerizable carbon-carbon double bond-containing group at position 2 include 2-vinyl-2-oxazoline, 2-vinyl-4-methyl-2-oxazoline, 2-vinyl-4-ethyl-2-oxazoline, 2-vinyl-4-propyl-2-oxazoline, 2-vinyl-4-butyl-2-oxazoline, 2-vinyl-5-methyl-2-oxazoline, 2-vinyl-5-ethyl-2-oxazoline, 2-vinyl-5-propyl-2-oxazoline, 2-vinyl-5-butyl-2-oxazoline, 2-isopropenyl-2-oxazoline, 2-isopropenyl-4-methyl-2-oxazoline, 2-isopropenyl-4-ethyl-2-oxazoline, 2-isopropenyl-4-propyl-2-oxazoline, 2-isopropenyl-4-butyl-2-oxazoline, 2-isopropenyl-5-methyl-2-oxazoline, 2-isopropenyl-5-ethyl-2-oxazoline, 2-isopropenyl-5-propyl-2-oxazoline and 2-isopropenyl-5-butyl-2-oxazoline. In terms of availability and other considerations, 2-isopropenyl-2-oxazoline is preferred.

Also, from the standpoint of preparing a conductive carbon material dispersion using an aqueous solvent, it is preferable for the oxazoline polymer to be water-soluble.

Such a water-soluble oxazoline polymer may be a homopolymer of an oxazoline monomer of formula (1) above. However, to increase the solubility in water, this polymer is preferably one obtained by radical-polymerizing at least two types of monomers: the above oxazoline monomer and a hydrophilic functional group-bearing (meth) acrylate ester monomer.

Illustrative examples of hydrophilic functional group-bearing (meth)acrylic monomers include (meth)acrylic acid, 2-hydroxyethyl acrylate, methoxypolyethylene glycol acrylate, monoesterified products of acrylic acid and polyethylene glycol, 2-aminoethyl acrylate and salts thereof, 2-hydroxyethyl methacrylate, methoxypolyethylene glycol methacrylate, monoesterified products of methacrylic acid and polyethylene glycol, 2-aminoethyl methacrylate and salts thereof, sodium (meth)acrylate, ammonium (meth) acrylate, (meth)acrylonitrile, (meth)acrylamide, N-methylol (meth)acrylamide, N-(2-hydroxyethyl) (meth)acrylamide and sodium styrenesulfonate. These may be used singly or two or more may be used in combination. Of these, methoxypolyethylene glycol (meth)acrylate, and monoesterified products of (meth)acrylic acid and polyethylene glycol are preferred.

In the practice of this invention, concomitant use may be made of monomers other than the oxazoline monomer and the hydrophilic group-bearing (meth)acrylic monomer, provided that doing so does not adversely affect the ability of the resulting oxazoline polymer to disperse conductive carbon materials.

Illustrative examples of such other monomers include (meth)acrylate ester monomers such as methyl (meth)acrylate, ethyl (meth)acrylate, butyl (meth)acrylate, 2-ethylhexyl (meth)acrylate, stearyl (meth)acrylate, perfluoroethyl (meth) acrylate and phenyl (meth)acrylate; α-olefin monomers such as ethylene, propylene, butene and pentene; haloolefin monomers such as vinyl chloride, vinylidene chloride and vinyl fluoride; styrene monomers such as styrene and α-methylstyrene; vinyl carboxylate monomers such as vinyl acetate and vinyl propionate; and vinyl ether monomers such as methyl vinyl ether and ethyl vinyl ether. These may be used singly or two or more may be used in combination.

From the standpoint of further increasing the ability of the resulting oxazoline polymer to disperse the conductive carbon materials, the content of oxazoline monomer in the monomer ingredients that can be used to produce the oxazoline polymer employed in the practice of the invention is preferably at least 10 wt %, more preferably at least 20 wt %, and even more preferably at least 30 wt %. The upper limit in the content of oxazoline monomer in the monomer ingredients is 100 wt %, in which case a homopolymer of the oxazoline monomer is obtained.

To further increase the water solubility of the resulting oxazoline polymer, the content of hydrophilic functional group-bearing (meth)acrylic monomer in the monomer ingredients is preferably at least 10 wt %, more preferably at least 20 wt %, and even more preferably at least 30 wt %.

As mentioned above, the content of other monomers in the monomer ingredients is in a range that does not affect the ability of the resulting oxazoline polymer to disperse conductive carbon materials. This content differs depending on the type of monomer and thus cannot be strictly specified, but may be suitably set in a range of from 5 to 95 wt %, and preferably from 10 to 90 wt %.

The average molecular weight of the oxazoline polymer is not particularly limited, although a weight-average molecular weight of from 1,000 to 2,000,000 is preferred. When the polymer has a weight-average molecular weight below 1,000, it may have a markedly decreased ability to disperse conductive carbon materials or may even exhibit no such ability. On the other hand, at a weight-average molecular weight greater than 2,000,000, the polymer may be very difficult to handle in dispersion treatment. An oxazoline polymer having a weight-average molecular weight of from 2,000 to 1,000,000 is more preferred.

The weight-average molecular weight in this invention is a measured value (polystyrene equivalent) obtained by gel permeation chromatography.

The oxazoline polymer used in the invention may be produced by polymerizing the above monomers using a known radical polymerization process such as those described in JP-A H06-32844 and JP-A 2013-72002.

Alternatively, oxazoline polymers available as commercial products may be used in the invention. Illustrative examples of such commercial products include Epocros WS-300 (from Nippon Shokubai Co., Ltd.; solids concentration, 10 wt %; aqueous solution), Epocros WS-700 (Nippon Shokubai Co., Ltd.; solids concentration, 25 wt %; aqueous solution), Epocros WS-500 (Nippon Shokubai Co., Ltd.; solids concentration, 39 wt %; water/1-methoxy-2-propanol solution), Poly(2-ethyl-2-oxazoline) (Aldrich), Poly(2-ethyl-2-oxazoline) (Alfa Aesar), and Poly(2-ethyl-2-oxazoline) (VWR International, LLC).

When the oxazoline polymer is commercially available as a solution, the solution may be used directly to form a conductive carbon material dispersion, or it may be prepared as a conductive carbon material dispersion in the target solvent system by solvent displacement.

Conductive carbon materials that may be used together with the above described oxazoline polymer are not particularly limited. However, when used to form a bonding layer for a secondary battery, fibrous conductive carbon materials, layered conductive carbon materials and granular conductive carbon materials are preferred. These conductive carbon materials may be used singly or two or more may be used in admixture.

Illustrative examples of fibrous conductive carbon materials include carbon nanotubes (CNTs) and carbon nanofibers (CNFs). From the standpoint of electrical conductivity, dispersibility, availability and the like, CNTs are preferred.

CNTs are generally produced by, for example, an arc discharge process, chemical vapor deposition (CVD) or laser ablation. The CNTs used in this invention may be obtained by any of these methods. CNTs are categorized as single-walled CNTs composed of a single cylindrically rolled graphene sheet (abbreviated below as "SWCNTs"), double-walled CNTs composed of two concentrically rolled graphene sheets (abbreviated below as "DWCNTs"), and multi-walled CNTs composed of a plurality of concentrically rolled graphene sheets (abbreviated below as "MWCNTs"). In this invention, SWCNTs, DWCNTs and MWCNTs may each be used alone or a plurality of these types of CNTs may be used in combination.

When synthesizing SWCNTs, DWCNTs and MWCNTs by the above methods, catalyst metals such as nickel, iron, cobalt and yttrium sometimes remain present. Hence, purification to remove these impurities may be necessary. Acid treatment with nitric acid, sulfuric acid or the like in combination with ultrasonication is effective for removing impurities. In acid treatment with nitric acid, sulfuric acid or the like, the $\pi$ conjugated system making up the CNTs may be destroyed, resulting in a loss of the inherent properties of the CNTs. It is thus desirable to purify and use the CNTs under suitable conditions.

Examples of layered conductive carbon materials include graphite and graphene. The graphite is not particularly limited. Use may be made of various types of commercially available graphite.

Graphene is composed of one atom thick sheets of sp2-bonded carbon atoms and has a beehive-like hexagonal lattice structure composed of the carbon atoms and their bonds. The sheet thickness is reportedly about 0.38 nm. Aside from graphene oxide that is commercially available, use can also be made of graphene oxide obtained via the treatment of graphite by Hummers' method.

Illustrative examples of granular conductive carbon materials include carbon blacks such as furnace black, channel black, acetylene black and thermal black. The carbon black is not particularly limited, the use of various types of commercially available carbon blacks being possible. The particle size is preferably from 5 nm to 500 nm.

The conductive carbon material dispersion of the invention includes the above-described oxazoline polymer (conductive carbon material-dispersing agent), a conductive carbon material and a solvent, and is obtained by dispersing the conductive carbon material in the solvent.

Illustrative examples of the solvent include water, and the following organic solvents: ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, isopropanol and n-propanol; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; and glycols such as ethylene glycol and propylene glycol. These solvents may be used singly or two or more may be used in admixture.

In particular, from the standpoint of increasing the proportion of individually dispersed conductive carbon material that is individually dispersed, water, NMP, DMF, THF, methanol and isopropanol are preferred. These solvents may each be used alone, or two or more may be used in admixture. In addition, depending on the solvent used, to enhance the film-formability of the composition, it is desirable to include a small amount of, for example, glycol ethers such as ethylene glycol monoethyl ether, ethylene glycol monobutyl ether and propylene glycol monomethyl ether; ketones such as acetone, methyl ethyl ketone and cyclohexanone; and glycols such as propylene glycol.

In cases where the above-described oxazoline polymer is used, the dispersibility and film formability are good even when hydrophilic solvents such as alcohols, glycol ethers or glycols are used. Moreover, the dispersibility and film formability do not decline even when a mixed solvent of these hydrophilic solvents and water is used or when water alone is used as the solvent.

Nowadays, owing to the trend away from reliance on organic solvents, there exists a desire for materials which use water as the solvent. Accordingly, in the conductive carbon material dispersion of this invention as well, the use of a mixed solvent of a hydrophilic solvent and water or of water alone as the solvent is preferred, with the use of water alone as the solvent being most preferred.

Any suitable method may be used to prepare the conductive carbon material dispersion of the invention. That is, the dispersion may be prepared by mixing together the oxazoline polymer (dispersing agent), conductive carbon material and solvent in any order.

At this time, it is preferable to subject a mixture of the oxazoline polymer, conductive carbon material and solvent to dispersion treatment. Such treatment enables the proportion in which the conductive carbon material is dispersed to be further increased. Examples of dispersion treatment include mechanical treatment such as wet treatment using a ball mill, bead mill, jet mill or the like, or ultrasonic treatment using a bath-type or probe-type sonicator.

The dispersion treatment time may be set as appropriate, with a period of from about 1 minute to about 10 hours being preferred, and a period of from about 5 minutes to about 5 hours being more preferred.

Because the oxazoline polymer used in the invention has an excellent ability to disperse the conductive carbon material, a composition in which the conductive carbon material is dispersed to a high concentration can be obtained without, prior to dispersion treatment for example, carrying out heating treatment. However, if necessary, heating treatment may be carried out.

The mixing ratio of the oxazoline polymer and the conductive carbon material in the conductive carbon material dispersion of the invention, expressed as a weight ratio, may be set to from 1,000:1 to 1:1,000.

The concentration of oxazoline polymer in the dispersion is not particularly limited, provided it is a concentration that enables the conductive carbon material to be dispersed in the solvent. However, the concentration is preferably set to about 0.001 to 30 wt %, and more preferably about 0.002 to 20 wt %.

In addition, the concentration of conductive carbon material in the dispersion varies according to the mechanical, electrical and thermal characteristics required of the thin-film and may be set as desired, provided at least some portion of the conductive carbon material is individually dispersed. The concentration of conductive carbon material in the dispersion is preferably from about 0.0001 to about 30 wt %, more preferably from about 0.001 to about 20 wt %, and even more preferably from about 0.001 to about 10 wt %.

In the conductive carbon material dispersion prepared as described above, it is presumed that the dispersing agent physically adsorbs to the surface of the conductive carbon material, forming a composite.

The conductive carbon material dispersion may include a crosslinking agent that is soluble in the above-described solvent.

The crosslinking agent may be a compound that gives rise to a crosslinking reaction with the oxazoline groups on the oxazoline polymer, or may be a compound that is self-crosslinking. From the standpoint of further increasing the solvent resistance of the resulting thin-film, a compound that gives rise to a crosslinking reaction with the oxazoline groups is preferred.

The compound that gives rise to a crosslinking reaction with oxazoline groups is not particularly limited, provided it is a compound having two or more functional groups that react with oxazoline groups, such as carboxyl groups, hydroxyl groups, thiol groups, amino groups, sulfinic acid groups and epoxy groups. A compound having two or more carboxyl groups is preferred. Compounds which, under heating during thin-film formation or in the presence of an acid catalyst, form the above functional groups and give rise to crosslinking reactions, such as the sodium, potassium, lithium and ammonium salts of carboxylic acids, may also be used as crosslinking agents.

Examples of compounds which give rise to crosslinking reactions with oxazoline groups include the metal salts of synthetic polymers such as polyacrylic acid and copolymers thereof or of natural polymers such as carboxymethylcellulose or alginic acid which give rise to crosslink reactivity in the presence of an acid catalyst, and ammonium salts of these same synthetic polymers and natural polymers which give rise to crosslink reactivity under heating. Sodium polyacrylate, lithium polyacrylate, ammonium polyacrylate, carboxymethylcellulose sodium, carboxymethylcellulose lithium and carboxymethylcellulose ammonium, which give rise to crosslink reactivity in the presence of an acid catalyst or under heating conditions, are especially preferred.

Such compounds that give rise to crosslinking reactions with oxazoline groups may be acquired as commercial products. Examples of such commercial products include sodium polyacrylate (Wako Pure Chemical Industries Co., Ltd.; degree of polymerization, 2,700 to 7,500), carboxymethylcellulose sodium (Wako Pure Chemical Industries, Ltd.), sodium alginate (Kanto Chemical Co., Ltd.; extra pure reagent), Aron A-30 (ammonium polyacrylate, from Toagosei Co., Ltd.; solids concentration, 32 wt %; aqueous solution), DN-800H (carboxymethylcellulose ammonium, from Daicel FineChem, Ltd.), and ammonium alginate (Kimica Corporation).

Examples of self-crosslinking compounds include compounds having, on the same molecule, crosslinkable functional groups which react with one another, such as a hydroxyl group with an aldehyde group, epoxy group, vinyl group, isocyanate group or alkoxy group; a carboxyl group with an aldehyde group, amino group, isocyanate group or epoxy group; or an amino group with an isocyanate group or aldehyde group; and compounds having like crosslinkable functional groups which react with one another, such as hydroxyl groups (dehydration condensation), mercapto groups (disulfide linkage), ester groups (Claisen condensation), silanol groups (dehydration condensation), vinyl groups and acryl groups.

Specific examples of self-crosslinking compounds include any of the following which exhibit crosslink reactivity in the presence of an acid catalyst: polyfunctional acrylates, tetraalkoxysilanes, and block copolymers of blocked isocyanate group-containing monomers and monomers having at least one hydroxyl group, carboxyl group or amino group.

Such self-crosslinking compounds may be acquired as commercial products. Examples of commercial products include polyfunctional acrylates such as A-9300 (ethoxylated isocyanuric acid triacrylate, from Shin-Nakamura Chemical Co., Ltd.), A-GLY-9E (Ethoxylated glycerine triacrylate (EO 9 mol), from Shin-Nakamura Chemical Co., Ltd.) and A-TMMT (pentaerythritol tetraacrylate, from Shin-Nakamura Chemical Co., Ltd.); tetraalkoxysilanes such as tetramethoxysilane (Tokyo Chemical Industry Co., Ltd.) and tetraethoxysilane (Toyoko Kagaku Co., Ltd.); and blocked isocyanate group-containing polymers such as the Elastron Series E-37, H-3, H38, BAP, NEW BAP-15, C-52, F-29, W-11P, MF-9 and MF-25K (DKS Co., Ltd.).

These crosslinking agents may each be used singly or two or more may be used in combination.

The content of crosslinking agent varies according to, for example, the solvent to be used, the substrate to be used, and the viscosity and film shape required, but is generally from 0.001 to 80 wt %, preferably from 0.01 to 50 wt %, and more preferably from 0.05 to 40 wt %, based on the oxazoline polymer.

The conductive carbon material dispersion of the invention may include, as a catalyst for promoting the crosslinking reaction: an acidic compound such as p-toluenesulfonic acid, trifluoromethanesulfonic acid, pyridinium p-toluenesulfonic acid, salicylic acid, sulfosalicylic acid, citric acid, benzoic acid, hydroxybenzoic acid or naphthalenecarboxylic acid, and/or a thermal acid generator such as 2,4,4,6-tetrabromocyclohexadienone, benzoin tosylate, 2-nitrobenzyl tosylate or an alkyl ester of an organic sulfonic acid.

The catalyst content with respect to the conductive carbon material dispersing agent (oxazoline polymer) is typically from 0.0001 to 20 wt %, preferably from 0.0005 to 10 wt %, and more preferably from 0.001 to 3 wt %.

In addition, the conductive carbon material dispersion of the invention may include a matrix polymer. The content thereof within the dispersion, although not particularly limited, is preferably from about 0.0001 to about 99 wt %, and more preferably from about 0.001 to about 90 wt %.

Illustrative examples of matrix polymers include the following thermoplastic resins: fluoropolymers such as polyvinylidene fluoride (PVdF), polytetrafluoroethylene, tetrafluoroethylene-hexafluoropropylene copolymers, vinylidene fluoride-hexafluoropropylene copolymers (P(VDF-HFP)) and vinylidene fluoride-chlorotrifluoroethylene copolymers (P(VDF-CTFE)); polyolefin resins such as polyvinyl pyrrolidone, ethylene-propylene-diene ternary copolymers, polyethylene (PE), polypropylene (PP), ethylene-vinyl acetate copolymers (EVA) and ethylene-ethyl acrylate copolymers (EEA); polystyrene resins such as polystyrene (PS), high-impact polystyrene (HIPS), acrylonitrile-styrene copolymers (AS), acrylonitrile-butadiene-styrene copolymers (ABS), methyl methacrylate-styrene copolymers (MS) and styrene-butadiene rubbers; polycarbonate resins, vinyl chloride resins, polyamide resins, polyimide resins, (meth)acrylic resins such as sodium polyacrylate and polymethyl methacrylate (PMMA); polyester resins such as polyethylene terephthalate (PET), polybutylene terephthalate, polyethylene naphthalate, polybutylene naphthalate, polylactic acid (PLA), poly-3-hydroxybutyric acid, polycaprolactone, polybutylene succinate and polyethylene succinate/adipate; polyphenylene ether resins, modified polyphenylene ether resins, polyacetal resins, polysulfone resins, polyphenylene sulfide resins, polyvinyl alcohol resins, polyglycolic acids, modified starches, cellulose acetate, carboxymethylcellulose, cellulose triacetate, chitin, chitosan and lignin; the following electrically conductive polymers: polyaniline and emeraldine base (the semi-oxidized form of polyaniline), polythiophene, polypyrrole, polyphenylene vinylene, polyphenylene and polyacetylene; and the following thermoset or photocurable resins: epoxy resins, urethane acrylate, phenolic resins, melamine resins, urea resins and alkyd resins. However, because water is preferably used as the solvent in the conductive carbon material dispersion of the invention, the matrix polymer is preferably a water-soluble polymer such as sodium polyacrylate, carboxymethylcellulose sodium, water-soluble cellulose ether, sodium alginate, polyvinyl alcohol, polystyrenesulfonic acid or polyethylene glycol. Sodium polyacrylate and carboxymethylcellulose sodium are especially preferred.

Such a matrix polymer may be acquired as a commercial product. Illustrative examples of commercial products include sodium polyacrylate (Wako Pure Chemical Industries Co., Ltd.; degree of polymerization, 2,700 to 7,500), carboxymethylcellulose sodium (Wako Pure Chemical Industries, Ltd.), sodium alginate (Kanto Chemical Co., Ltd.; extra pure reagent), the Metolose SH Series (hydroxypropylmethyl cellulose, from Shin-Etsu Chemical Co., Ltd.), the Metolose SE Series (hydroxyethylmethyl cellulose, from Shin-Etsu Chemical Co., Ltd.), JC-25 (a fully saponified polyvinyl alcohol, from Japan Vam & Poval Co., Ltd.), JM-17 (an intermediately saponified polyvinyl alcohol, from Japan Vam & Poval Co., Ltd.), JP-03 (a partially saponified polyvinyl alcohol, from Japan Vam & Poval Co., Ltd.) and polystyrenesulfonic acid (from Aldrich Co.; solids concentration, 18 wt %; water-soluble).

When the conductive carbon material dispersion of the invention includes a polymer that is intended to serve as a crosslinking agent and/or matrix, the dispersion may be prepared by subjecting a mixture composed of at least the conductive carbon material, the conductive carbon material-dispersing agent, the solvent, and the polymer that is intended to serve as a crosslinking agent and/or matrix to mechanical treatment in the form of wet treatment using, for example, a ball mill, bead mill or jet mill, or in the form of ultrasonic treatment using a bath-type or probe-type sonicator. Wet treatment using a jet mill or ultrasonic treatment is especially preferred. The polymer that is to serve as a crosslinking agent or matrix may be added following preparation of the dispersion by the foregoing method.

The conductive carbon material dispersion of the invention can be advantageously used as a conductive thin film-forming composition in the same way as ordinary conductive carbon material dispersions.

As already mentioned, the oxazoline polymer (dispersing agent) included in the conductive carbon material dispersion of the invention not only has an excellent ability to disperse conductive carbon materials, it also has a high adhesion to the current-collecting substrates used in energy storage device electrodes.

Therefore, a conductive thin-film obtained from the conductive carbon material dispersion (conductive thin-film forming composition) of the invention is especially suitable as the conductive bonding layer that is interposed between, and bonds together, the current-collecting substrate and the active material layer making up an energy storage device electrode.

The energy storage device is exemplified by various types of energy storage devices such as electrical double-layer capacitors, lithium secondary batteries, lithium ion secondary batteries, proton polymer batteries, nickel-hydrogen batteries, aluminum solid capacitors, electrolytic capacitors and lead storage batteries.

In electrode production using the conductive thin-film-forming composition of the invention, it is preferable to first fabricate a composite current collector consisting of a current-collecting substrate and a conductive bonding layer.

This composite current collector can be fabricated by coating the above-described conductive carbon material dispersion (conductive thin film-forming composition) onto a current collecting substrate, then drying the applied dispersion in air or under heating to form a conductive bonding layer.

The current-collecting substrate used may be one that is suitably selected from among those which have hitherto been used as current-collecting substrates in electrodes for energy storage devices. For example, use can be made of thin-films of copper, aluminum, nickel, gold, silver and alloys thereof, and also carbon materials, metal oxides, and conductive polymers.

The thickness is not particularly limited, although a thickness of from 1 to 100 μm is preferred in this invention.

The thickness of the conductive bonding layer also is not particularly limited. However, taking into account the decrease in internal resistance, a thickness of from 0.05 to 10 μm is preferred.

Examples of the coating method include spin coating, dip coating, flow coating, inkjet printing, spray coating, bar coating, gravure coating, slit coating, roll coating, flexographic printing, transfer printing, brush coating, blade coating and air knife coating. From the standpoint of work efficiency and other considerations, inkjet printing, casting, dip coating, bar coating, blade coating, roll coating, gravure coating, flexographic printing and spray coating are preferred.

The temperature during drying under applied heat, although not particularly limited, is preferably from about 50° C. to about 200° C., and more preferably from about 80° C. to about 150° C.

An electrode for an energy storage device can be produced by forming an active material layer on the conductive bonding layer of the composite current collector.

The active material used here may be any of the various types of active materials that have hitherto been used in electrodes for energy storage devices.

For example, in the case of lithium secondary batteries and lithium ion secondary batteries, chalcogen compounds capable of lithium ion insertion and extraction, lithium ion-containing chalcogen compounds, polyanion compounds, elemental sulfur and sulfur compounds may be used as the positive electrode active material.

Illustrative examples of such chalcogen compounds capable of lithium ion insertion and extraction include $FeS_2$, $TiS_2$, $MoS_2$, $V_2O_6$, $V_6O_{13}$ and $MnO_2$.

Illustrative examples of lithium ion-containing chalcogen compounds include $LiCoO_2$, $LiMnO_2$, $LiMn_2O_4$, $LiMo_2O_4$, $LiV_3O_8$, $LiNiO_2$ and $Li_xNi_yM_{1-y}O_2$ (wherein M is at least one metal element selected from among cobalt, manganese, titanium, chromium, vanadium, aluminum, tin, lead and zinc; and the conditions $0.05 \leq x \leq 1.10$ and $0.5 \leq y \leq 1.0$ are satisfied).

An example of a polyanion compounds is $LiFePO_4$.

Illustrative examples of sulfur compounds include $Li_2S$ and rubeanic acid.

The following may be used as the negative electrode active material in the negative electrode: alkali metals, alkali alloys, at least one elemental substance selected from among group 4 to 15 elements of the periodic table which insert and extract lithium ions, as well as oxides, sulfides and nitrides thereof, and carbon materials which are capable of reversibly inserting and extracting lithium ions.

Illustrative examples of alkali metals include lithium, sodium and potassium. Illustrative examples of alkali metal alloys include metallic lithium, Li—Al, Li—Mg, Li—Al—Ni, sodium, Na—Hg and Na—Zn.

Illustrative examples of at least one elemental substance selected from among group 4 to 15 elements of the periodic table which insert and extract lithium ions include silicon, tin, aluminum, zinc and arsenic.

Illustrative examples of oxides include tin silicon oxide ($SnSiO_3$), lithium bismuth oxide ($Li_3BiO_4$), lithium zinc oxide ($Li_2ZnO_2$) and lithium titanium oxide ($Li_4Ti_5O_{12}$).

Illustrative examples of sulfides include lithium iron sulfides ($Li_xFeS_2$ ($0 \leq x \leq 3$)) and lithium copper sulfides ($Li_xCuS$ ($0 \leq x \leq 3$)).

Exemplary nitrides include lithium-containing transition metal nitrides, illustrative examples of which include $Li_xM_yN$ (wherein M is cobalt, nickel or copper; $0 \leq x \leq 3$, and $0 \leq y \leq 0.5$) and lithium iron nitride ($Li_3FeN_4$).

Examples of carbon materials which are capable of reversibly inserting and extracting lithium ions include graphite, carbon black, coke, glassy carbon, carbon fibers, carbon nanotubes, and sintered compacts of these.

In the case of electrical double-layer capacitors, a carbonaceous material may be used as the active material.

The carbonaceous material is exemplified by activated carbon, such as activated carbon obtained by carbonizing a phenolic resin, then subjecting the carbonized resin to activation treatment.

The active material layer may be formed by applying an electrode slurry containing the above-described active material, binder polymer and, optionally, a solvent onto the conductive bonding layer, then drying in air or under heating.

A known material may be suitably selected and used as the binder polymer. Illustrative examples of such binder polymers include electrically conductive polymers such as polyvinylidene fluoride (PVdF), polyvinylpyrrolidone, polytetrafluoroethylene, tetrafluoroethylene-hexafluoropropylene copolymers, vinylidene fluoride-hexafluoropropylene copolymers (P(VDF-HFP)), vinylidene fluoride-chlorotrifluoroethylene copolymers (P(VDF-CTFE)), polyvinyl alcohol, polyimide, ethylene-propylene-diene ternary copolymers, styrene-butadiene rubbers, carboxymethyl cellulose (CMC), polyacrylic acid (PAA) and polyaniline.

The amount of binder polymer added per 100 parts by weight of the active material is preferably from 0.1 to 20 parts by weight, and more preferably from 1 to 10 parts by weight.

The solvent is exemplified by the solvents mentioned above in connection with the oxazoline polymer. The solvent may be suitably selected from among these according to the type of binder, although NMP is preferred in the case of water-insoluble binders such as PVdF, and water is preferred in the case of water-soluble binders such as PAA.

The electrode slurry may also contain a conductive additive. Illustrative examples of conductive additives include carbon black, ketjen black, acetylene black, carbon whiskers, carbon fibers, natural graphite, synthetic graphite, titanium oxide, ruthenium oxide, aluminum and nickel.

The method of applying the electrode slurry is exemplified by the same techniques as mentioned above for the conductive bonding layer-forming composition.

The temperature when drying under applied heat, although not particularly limited, is preferably from about 50° C. to about 400° C., and more preferably from about 80° C. to about 150° C.

Alternatively, the electrode may be optionally pressed. Any commonly used method may be employed for pressing, although a mold pressing or roll pressing method is especially preferred. The pressing force in roll pressing, although not particularly limited, is preferably from 0.2 to 3 ton/cm.

The energy storage device of the invention is equipped with the above-described electrode. More specifically, it is constructed of at least a pair of positive and negative electrodes, a separator interposed between these electrodes, and an electrolyte, with at least one of the positive and negative electrodes being the above-described energy storage device electrode.

Because this energy storage device is characterized by the use therein of the above-described energy storage device electrode, the separator, electrolyte and other constituent members of the device may be suitably selected for use from among known materials.

Illustrative examples of the separator include cellulose-based separators and polyolefin-based separators.

The electrolyte may be either a liquid or a solid, and moreover may be either aqueous or non-aqueous, the energy storage device electrode of the invention being capable of exhibiting a performance sufficient for practical purposes even when employed in devices that use a non-aqueous electrolyte.

The non-aqueous electrolyte is exemplified by a non-aqueous electrolyte solution obtained by dissolving an electrolyte salt in a non-aqueous organic solvent.

Illustrative examples of the electrolyte salt include lithium salts such as lithium tetrafluoroborate, lithium hexafluorophosphate, lithium perchlorate and lithium trifluoromethanesulfonate; quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate; and lithium bis(trifluoromethanesulfonyl)imide and lithium bis(fluorosulfonyl)imide.

Illustrative examples of non-aqueous organic solvents include alkylene carbonates such as propylene carbonate, ethylene carbonate and butylene carbonate, dialkyl carbonates such as dimethyl carbonate, methyl ethyl carbonate and diethyl carbonate, nitriles such as acetonitrile, and amides such as dimethylformamide.

EXAMPLES

Examples of the invention and Comparative Examples are given below by way of illustration, although the invention is not limited by the following Examples. The instruments used were as follows.
(1) Probe-type ultrasonicator (dispersion treatment):
   UIP1000 (Hielscher Ultrasonics GmbH)
(2) Wire bar coater (thin-film production):
   PM-9050MC (SMT Co., Ltd.)
(3) Select-Roller:
   OSP-30 (Matsuo Sangyo Co., Ltd.)
(4) Charge/discharge measurement system (evaluation of secondary batteries):
   HJ1001 SMSA (Hokuto Denko Corporation)
(5) Micrometer (measurement of binder and active material layer thicknesses):
   IR54 (Mitutoyo Corporation)
(6) T.K. Robomix (with Homogenizing Disperser model 2.5 (32 mm dia.)), from Primix Corporation
(7) Thin-film spin-type high-speed mixer:
   Filmix model 40 (Primix Corporation)
(8) Planetary centrifugal mixer:
   Thinky Mixer ARE-310 (Thinky)
(9) Roll press:
   HSR-60150H ultra-small desktop hot roll press (Hohsen Corporation)
(10) Impedance measurement:
   PARSTAT 2273 (Princeton Applied Research)

[1] Preparation of Conductive Carbon Material Dispersions

Example 1-1

The oxazoline polymer-containing aqueous solution Epocros WS-300 (from Nippon Shokubai Co., Ltd.; solids concentration, 10 wt %; weight-average molecular weight, $1.2 \times 10^5$; oxazoline group content, 7.7 mmol/g), 4.9 g, was mixed together with 44.6 g of distilled water, after which 0.5 g of multi-walled CNTs ("NC7000", from Nanocyl) was mixed therein. The resulting mixture was ultrasonically treated for 30 minutes at room temperature using a probe-type ultrasonicator, thereby preparing Conductive Carbon Material Dispersion A.

Example 1-2

The oxazoline polymer-containing aqueous solution Epocros WS-700 (Nippon Shokubai Co., Ltd.; solids concentration, 25 wt %; weight-average molecular weight, $4 \times 10^4$; oxazoline group content, 4.5 mmol/g), 2.0 g, was mixed together with 47.5 g of distilled water, after which 0.5 g of multi-walled CNTs ("NC7000", from Nanocyl) was mixed therein. The resulting mixture was ultrasonically treated for 30 minutes at room temperature using a probe-type ultrasonicator, thereby preparing Conductive Carbon Material Dispersion B.

Example 1-3

Sodium polyacrylate (PAA-Na) (Wako Pure Chemical Industries Co., Ltd.; degree of polymerization, 2,700 to 7,500), 0.36 g, was dissolved in 49.64 g of distilled water. The resulting solution was mixed with 50 g of Conductive Carbon Material Dispersion A prepared in Example 1-1, thereby preparing Conductive Carbon Material Dispersion C.

Example 1-4

The ammonium polyacrylate (PAA-NH$_4$)-containing aqueous solution Aron A-30 (Toagosei Co., Ltd.; solids concentration, 31.6 wt %), 1.09 g, was mixed together with 48.91 g of distilled water. The resulting solution was mixed with 50 g of Conductive Carbon Material Dispersion A prepared in Example 1-1, thereby preparing Conductive Carbon Material Dispersion D.

Example 1-5

Sodium polyacrylate (PAA-Na) (Wako Pure Chemical Industries Co., Ltd.; degree of polymerization, 2,700 to 7,500), 0.33 g, and 0.11 g of the polyacrylic acid (PAA)-containing aqueous solution Aron A-10H (Toagosei Co., Ltd.; solids concentration, 25.8 wt %) were mixed together with 49.56 g of distilled water. The resulting solution was mixed with 50 g of Conductive Carbon Material Dispersion A prepared in Example 1-1, thereby preparing Conductive Carbon Material Dispersion E.

Example 1-6

Sodium polyacrylate (PAA-Na) (Wako Pure Chemical Industries Co., Ltd.; degree of polymerization, 2,700 to 7,500), 0.33 g, and 0.11 g of the ammonium polyacrylate (PAA-NH$_4$)-containing aqueous solution Aron A-30 (Toagosei Co., Ltd.; solids concentration, 31.6 wt %) were mixed together with 49.56 g of distilled water. The resulting solution was mixed with 50 g of Conductive Carbon Material Dispersion A prepared in Example 1-1, thereby preparing Conductive Carbon Material Dispersion F.

Example 1-7

The oxazoline polymer-containing aqueous solution Epocros WS-300 (Nippon Shokubai Co., Ltd.; solids concentration, 10 wt %; weight-average molecular weight, 1.2×10$^5$; oxazoline group content, 7.7 mmol/g), 4.9 g, was mixed together with 44.6 g of distilled water, after which 0.5 g of multi-walled CNTs ("AMC", from Ube Industries, Ltd.) was mixed therein. The resulting mixture was ultrasonically treated for 30 minutes at room temperature using a probe-type ultrasonicator, after which a solution of 0.33 g of sodium polyacrylate (PAA-Na; Wako Pure Chemical Industries Co., Ltd.; degree of polymerization, 2,700 to 7,500) and 0.11 g of the polyacrylic acid (PAA)-containing aqueous solution Aron A-10H (Toagosei Co., Ltd.; solids concentration, 25.8 wt %) dissolved in 49.46 g of distilled water was mixed therein, thereby preparing Conductive Carbon Material Dispersion G.

Examples 1-8 to 1-11

Aside from using multi-walled CNT's ("VGCF-X", from Showa Denko KK), acetylene black ("Denka Black", from Denki Kagaku Kogyo K.K.), graphene ("WGNP", from Bridgestone KBG Co., Ltd.) or multi-walled CNT's ("Baytubes", from Bayer) instead of the multi-walled CNT's available from Ube Industries, Ltd. as "AMC", Conductive Carbon Material Dispersions H to K were prepared by the same method as in Example 1-7.

Example 1-12

The ammonium polyacrylate (PAA-NH$_4$)-containing aqueous solution Aron A-30 (Toagosei Co., Ltd.; solids concentration, 31.6 wt %), 0.275 g, and 8 g of a 1% aqueous solution of ammonium alginate (NH$_4$ alginate) (from Kimica Corporation) were mixed together with 11.73 g of distilled water. The resulting solution was mixed with 20 g of Conductive Carbon Material Dispersion A prepared in Example 1-1, thereby preparing Conductive Carbon Material Dispersion L.

Example 1-13

The ammonium polyacrylate (PAA-NH$_4$)-containing aqueous solution Aron A-30 (Toagosei Co., Ltd.; solids concentration, 31.6 wt %), 0.7 g, and 0.2 g of sodium alginate (Na alginate) (Kanto Chemical Co., Ltd.; extra pure reagent) were mixed together with 49.1 g of distilled water. The resulting solution was mixed with 50 g of Conductive Carbon Material Dispersion B prepared in Example 1-2, thereby preparing Conductive Carbon Material Dispersion M.

Example 1-14

The ammonium polyacrylate (PAA-NH$_4$)-containing aqueous solution Aron A-30 (Toagosei Co., Ltd.; solids concentration, 31.6 wt %), 0.7 g, and 0.2 g of sodium alginate (Na alginate) (Kanto Chemical Co., Ltd.; extra pure reagent) were mixed together with 49.1 g of distilled water. The resulting solution was mixed with 50 g of Conductive Carbon Material Dispersion I prepared in Example 1-9, thereby preparing Conductive Carbon Material Dispersion N.

Comparative Example 1-1

Polyvinylpyrrolidone (Tokyo Chemical Industry Co., Ltd.; molecular weight, 630,000), 0.5 g, and 49.0 g of distilled water were mixed together, after which 0.5 g of multi-walled CNT's ("NC7000", from Nanocyl) was mixed therein. The resulting mixture was ultrasonically treated for 30 minutes at room temperature using a probe-type ultrasonicator, thereby preparing a conductive carbon material dispersion.

Comparative Example 1-2

Polyvinylpyrrolidone (Tokyo Chemical Industry Co., Ltd.; molecular weight, 40,000), 0.5 g, and 49.0 g of distilled water were mixed together, after which 0.5 g of multi-walled CNT's ("NC7000", from Nanocyl) was mixed therein. The resulting mixture was ultrasonically treated for 30 minutes at room temperature using a probe-type ultrasonicator, thereby preparing a conductive carbon material dispersion.

Comparative Example 1-3

Polyvinyl alcohol (JF-17, from Toagosei Co., Ltd.), 0.5 g, and 49.0 g of distilled water were mixed together, after which 0.5 g of multi-walled CNT's ("NC7000", from Nanocyl) was mixed therein. Preparation of a conductive carbon material dispersion was attempted by ultrasonically treating the resulting mixture for 30 minutes at room temperature using a probe-type ultrasonicator. However, aggregates were present in the mixture following treatment and so a uniform dispersion could not be obtained.

Comparative Example 1-4

A polyacrylamide solution (from Aldrich Co.; weight-average molecular weight, 10,000; solids concentration, 50 wt %), 1.0 g, and 48.5 g of distilled water were mixed together, after which 0.5 g of multi-walled CNT's ("NC7000", from Nanocyl) was mixed therein. Preparation of a conductive carbon material dispersion was attempted by ultrasonically treating the resulting mixture for 30 minutes at room temperature using a probe-type ultrasonicator. However, aggregates were present in the mixture following treatment and so a uniform dispersion could not be obtained.

Comparative Example 1-5

The sodium polyacrylate (PAA-Na)-containing aqueous solution Aron A-7195 (from Toagosei Co., Ltd.; solids concentration, 19 wt %), 2.63 g, and 46.87 g of distilled water were mixed together, after which 0.5 g of multi-walled CNT's ("NC7000", from Nanocyl) was mixed therein. Preparation of a conductive carbon material dispersion was attempted by ultrasonically treating the resulting mixture for 30 minutes at room temperature using a probe-type ultrasonicator. However, aggregates were present in the mixture following treatment and so a uniform dispersion could not be obtained.

Comparative Example 1-6

The ammonium polyacrylate (PAA-NH$_4$)-containing aqueous solution Aron A-30 (from Toagosei Co., Ltd.; solids concentration, 31.6 wt %), 1.58 g, and 47.92 g of distilled water were mixed together, after which 0.5 g of multi-walled CNT's ("NC7000", from Nanocyl) was mixed therein. Preparation of a conductive carbon material dispersion was attempted by ultrasonically treating the resulting mixture for 30 minutes at room temperature using a probe-type ultrasonicator. However, aggregates were present in the mixture following treatment and so a uniform dispersion could not be obtained.

As is apparent from the above results, aggregates did not arise in the conductive carbon material dispersions of the Examples and so these dispersions were uniform. Although an aggregate-free conductive carbon material dispersion was obtained when polyvinylpyrrolidone was used as the dispersing agent, when polyvinyl alcohol, polyacrylamide, sodium polyacrylate or ammonium polyacrylate was used as the dispersing agent, aggregates formed, making it impossible to obtain a uniform conductive carbon material dispersion.

It was apparent from the above that oxazoline polymers act effectively as dispersing agents for dispersing conductive carbon materials in water.

[2] Production of Conductive Thin-Films

Conductive thin-film production was attempted using the respective dispersions prepared in Examples 1-1 to 1-11 and Comparative Examples 1-1 and 1-2, all of which were uniform conductive carbon material dispersions.

Example 2-1

The conductive carbon material dispersion of Example 1-1 was uniformly spread over aluminum foil (thickness, 20 µm) with a wiper coater (OSP-30 Select-Roller; wet film thickness, 30 µm), then dried at 120° C. for 20 minutes, thereby producing a conductive thin-film.

Examples 2-2 to 2-11

Aside from using the respective conductive carbon material dispersions prepared in Examples 1-2 to 1-11 instead of the conductive carbon material dispersion of Example 1-1, conductive thin-films were produced by the same method as in Example 2-1.

Example 2-12

Conductive Carbon Material Dispersion L of Example 1-12 was uniformly spread over copper foil (thickness, 20 µm) with a wiper coater (OSP-30 Select-Roller; wet film thickness, 30 µm), then dried at 120° C. for 20 minutes and additionally dried in a vacuum at 150° C. for 20 minutes, thereby producing a conductive thin-film.

Examples 2-13 and 2-14

Aside from using the respective conductive carbon material dispersions prepared in Examples 1-13 and 1-14 instead of the conductive carbon material dispersion of Example 1-1 and drying at 150° C. for 20 minutes instead of at 120° C. for 20 minutes, conductive thin-films were produced in each of the examples by the same method as in Example 2-1.

The laminates obtained above consisting of aluminum foil or copper foil and a conductive thin-film were used in the subsequently described Examples as composite current collectors consisting of aluminum foil as the current-collecting substrate and of a conductive thin-film as the bonding layer (the composite current collectors of Examples 2-1 to 2-9, 2-13 and 2-14), or as a composite current collector consisting of copper foil as the current-collecting substrate and a conductive thin-film as the bonding layer (the composite current collector of Examples 2-12).

Comparative Examples 2-1 and 2-2

In each of these examples, conductive thin-film production was attempted by uniformly spreading the respective conductive carbon material dispersions prepared in Comparative Examples 1-1 and 1-2 on aluminum foil (thickness, 20 µm) with a wiper coater (SP-30 Select-Roller; wet film thickness, 30 µm), then drying the applied dispersion. However, the dispersion was repelled by the aluminum and could not be uniformly spread, as a result of which a conductive thin-film could not be produced.

As is apparent from the above results, it was possible to uniformly spread the dispersions in the Examples over metal such as aluminum or copper, enabling conductive thin-films to be produced on aluminum, whereas the dispersions in the Comparative Examples were repelled by aluminum and could not be formed into thin-films.

It was thus found that conductive carbon material dispersions containing an oxazoline polymer as the dispersing agent have an excellent film formability on metal such as aluminum.

CNT-containing conductive thin-films are often formed on metal and used. Also, given the current trend away from organic solvents, there exists a desire for materials that use water as the solvent. The oxazoline polymer-containing aqueous conductive carbon material dispersions of this invention may be regarded as desirable materials capable of addressing these needs.

[3] Evaluation of Adhesion and Solvent Resistance

The following methods were used to subject the conductive thin-films produced in Examples 2-1 to 2-14 to evaluations of their adhesion to aluminum or copper as the current-conducting substrate, and to evaluations of their solvent resistance. The results are shown in Table 1.

<Adhesion Test>

The conductive thin-film was crosscut at intervals of 1 mm, both vertically and horizontally, to form 100 square boxes, each measuring 1 mm on a side. Next, an adhesion test was carried out by attaching pressure-sensitive adhesive tape (CT-12S2P, from Nichiban Co., Ltd.) to this crosscut area, then peeling off the tape. The adhesion was rated as "Good" when none of the conductive thin-film whatsoever separated from the substrate, and was rated as "NG" when some or all of the crosscut area separated from the substrate.

<Solvent Resistance Test>

Solvent resistance tests were carried out by bringing cotton swabs impregnated with the respective solvents shown below into contact with the conductive bonding layer and passing the swab back and forth over the layer. The solvent resistance was rated as "Good" when none of the conductive bonding layer separated off, "Fair" when some separation occurred, and "NG" when all of the conductive bonding layer separated off.

1. Distilled water
2. Diethyl carbonate (DEC)
3. Mixed solvent of ethylene carbonate (EC) and diethyl carbonate (DEC) (EC/DEC=1/1 (v/v))
4. Propylene carbonate (PC)
5. Dimethylsulfoxide (DMSO) (Kanto Chemical Co., Ltd.)
6. Tetrahydrofuran (THF) (Kanto Chemical Co., Ltd.)
7. N-Methylpyrrolidone (NMP) (Junsei Chemical Co., Ltd.)

TABLE 1

| | | Carbon material | Additives | Solvent resistance | | | | | | | Adhesion |
|---|---|---|---|---|---|---|---|---|---|---|---|
| | | | | Distilled water | DEC | EC/DEC | PC | DMSO | THF | NMP | |
| Example | 2-1 | NC7000 | none | NG | NG | NG | NG | NG | NG | NG | good |
| | 2-2 | NC7000 | none | NG | NG | NG | NG | NG | NG | NG | good |
| | 2-3 | NC7000 | PAA-Na | fair | fair | fair | fair | fair | fair | fair | good |
| | 2-4 | NC7000 | PAA-NH$_4$ | good | good | good | good | good | good | good | good |
| | 2-5 | NC7000 | PAA-Na PAA | good | good | good | good | good | good | good | good |
| | 2-6 | NC7000 | PAA-Na PAA-NH$_4$ | good | good | good | good | good | good | good | good |
| | 2-7 | AMC | PAA-Na PAA | good | good | good | good | good | good | good | good |
| | 2-8 | VGCF-X | PAA-Na PAA | good | good | good | good | good | good | good | good |
| | 2-9 | Denka Black | PAA-Na PAA | good | good | good | good | good | good | good | good |
| | 2-10 | WGNP | PAA-Na PAA | good | good | good | good | good | good | good | good |
| | 2-11 | Baytubes | PAA-Na PAA | good | good | good | good | good | good | good | good |
| | 2-12 | NC7000 | PAA-NH$_4$ NH$_4$ alginate | good | good | good | good | good | good | good | good |
| | 2-13 | NC7000 | PAA-NH$_4$ Na alginate | good | good | good | good | good | good | good | good |
| | 2-14 | Denka Black | PAA-NH$_4$ Na alginate | good | good | good | good | good | good | good | good |

The conductive bonding layers produced from the dispersions prepared in Examples 1-1 and 1-2 which contained no additives (matrix polymer and crosslinking agent) were found to have a good adhesion to aluminum but a poor solvent resistance (Examples 2-1 and 2-2).

By contrast, the conductive bonding layer produced from the dispersion prepared in Example 1-3 to which PAA-Na had been added that was prepared in Example 1-3 had an improved solvent resistance (Example 2-3). Presumably, because the oxazoline groups do not give rise to a crosslinking reaction with PAA-Na, the PAA-Na functions as a matrix polymer, thereby improving the solvent resistance.

The conductive bonding layers produced from the respective dispersions prepared in Example 1-4 in which PAA-$NH_4$ was added, in Examples 1-5 and 1-7 to 1-11 in which PAA-Na and PAA were added, in Example 1-6 in which PAA-Na and PAA-$NH_4$ were added, in Example 1-12 in which PAA-$NH_4$ and $NH_4$ alginate were added, and in Examples 1-13 and 1-14 in which PPA-$NH_4$ and Na alginate were added all had further improved solvent resistances (Examples 2-4 to 2-11, 2-13 and 2-14).

PAA-$NH_4$ and $NH_4$ alginate release ammonia when heated, becoming PAA and alginate acid, each of which has a high reactivity with oxazoline. Also, PAA-Na and Na alginate are capable of reacting with oxazoline in the presence of an acid catalyst (PAA). Hence, the solvent resistance is thought to have further improved on account of crosslinking in which these compounds and oxazoline groups participated.

As noted above, in the peel tests, each of the conductive bonding layers produced using oxazoline polymers showed a high adhesion to the aluminum foil or copper foil serving as the current-collecting substrate and did not separate from the substrate whatsoever. It is apparent from this that, by using the conductive carbon material dispersion of the invention, it is possible to produce an electrode in which a thin-film formed on the current-collecting substrate does not readily fall off and which thus has an excellent durability.

In the solvent resistance tests, by adding a suitable matrix polymer and crosslinking agent to the conductive bonding layer produced using an oxazoline polymer, the durability to the dispersion medium in the electrode slurry or to an electrolyte solution can be increased. Hence, degradation of the conductive bonding layer due to dissolution, swelling, falling off or the like in an electrode slurry or an electrolyte solution can be suppressed. As a result, current can be drawn off without causing a voltage drop in the battery and, at the same time, a secondary battery having a long cycle life and a high safety can be produced. It is possible as well to produce electrical double-layer capacitors having a high safety.

[4] Electrode Production

Example 3-1

Lithium iron phosphate (LFP; available from Tatung Fine Chemicals Co; 17.3 g) as the active material, an NMP solution of PVdF (12 wt %; 12.8 g) as the binder, acetylene black (AB; available as Denka Black from Denki Kagaku Kogyo K.K.; 0.384 g) as the conductive additive and NMP (9.54 g) were mixed together and then treated at 3,500 rpm for 1 minute using a T.K. Robomix (with Homogenizing Disperser model 2.5 (32 mm dia.), from Primix Corporation). The mixture was then subjected to mixing treatment using a thin-film spin-type high-speed mixer (Filmix model 40, from Primix Corporation) at a peripheral speed of 20 m/s for 30 seconds, and subsequently deaerated at 1,000 rpm for 2 minutes with a planetary centrifugal mixer, thereby producing an electrode slurry (solids concentration, 48 wt %; LFP:PVdF:AB=8:90:2 (weight ratio)).

The electrode slurry thus prepared was uniformly spread by the doctor blade method onto the bonding layer of the current collector of Example 2-1 to a wet film thickness of 200 μm and subsequently dried, first at 80° C. for 30 minutes, then at 120° C. for 30 minutes, to form an active material layer on the conductive bonding layer. This was pressure-bonded with a roll press, thereby producing an electrode (film thickness, 55 μm).

Examples 3-2 to 3-9

Aside from using the respective composite current collectors of Examples 2-2 to 2-9 instead of the composite current collector of Example 2-1, electrodes were produced in the same way as in Example 3-1.

Comparative Example 3-1

Aside from using only aluminum foil (thickness, 20 μm)—that is, a current-collecting substrate—instead of the composite current collector of Example 2-1, an electrode was produced in the same way as in Example 3-1.

Example 3-10

Silicon (Si; available as SIE23PB from Kojundo Chemical Laboratory Co., Ltd.; 8.89 g) as the active material, an NMP solution of polyamic acid (PI, the reaction product of 4,4'-diaminodiphenyl ether and 3,3',4,4'-biphenyltetracarboxylic dianhydride) (15 wt %, 12.5 g) as the binder, acetylene black (AB; available as Denka Black from Denki Kagaku Kogyo K.K.; 0.936 g) as the conductive additive and NMP (7.69 g) were mixed together and then treated at 8,000 rpm for 1 minute using a T.K. Robomix (with Homogenizing Disperser model 2.5 (32 mm dia.), from Primix Corporation). The mixture was then subjected to mixing treatment using a thin-film spin-type high-speed mixer at a peripheral speed of 20 m/s for 60 seconds, and subsequently deaerated at 1,000 rpm for 2 minutes with a planetary centrifugal mixer, thereby producing an electrode slurry (solids concentration, 39 wt %; Si:PI:AB=76:16:8 (weight ratio)).

The electrode slurry thus prepared was uniformly spread by the doctor blade method onto the bonding layer of the composite current collector of Example 2-12 to a wet film thickness of 50 μm and subsequently dried, first at 80° C. for 30 minutes, then at 120° C. for 30 minutes, to form an active material layer on the conductive bonding layer. This was pressure-bonded with a roll press, then baked in a vacuum at 350° C. for 40 minutes, thereby producing an electrode.

Comparative Example 3-2

Aside from using only aluminum foil (thickness, 20 μm)—that is a current-collecting substrate—instead of the composite current collector of Example 2-12, an electrode was produced in the same way as in Example 3-10.

Example 3-11

Activated carbon (YP-50F, from Kuraray Chemical Co., Ltd.; 11.83 g), as the electrode material, 27.5 g of an aqueous solution (1 wt %) of an ammonium salt of carboxymethylcellulose (abbreviated below as CMC-NH4; available from Daicel Chemical Industries, Ltd. as Daicel CMC DN800H) as the binder, 0.69 g of acetylene black (AB; available as Denka Black from Denki Kagaku Kogyo K.K.) as the conductive additive, 13.02 g of distilled water and 1.96 g of a styrene-butadiene copolymer (SBR)-containing aqueous emulsion solution (available as TRD2001 from JSR Corporation; solids concentration, 48.5 wt %) were mixed together, and then treated at 5,000 rpm for 3 minutes using a T.K. Robomix (with Homogenizing Disperser model 2.5 (32 mm dia.), from Primix Corporation. The mixture was subjected to mixing treatment using a thin-film spin-type high-speed mixer (Filmix model 40, from Primix Corporation) at a peripheral speed of 20 m/s for 60 seconds, and subsequently deaerated at 1,000 rpm for 2 minutes with a planetary centrifugal mixer, thereby producing an electrode slurry (solids concentration, 25 wt %; activated carbon: CMC-NH4:AB:SBR=86:2:5:7 (weight ratio)).

The electrode slurry thus prepared was uniformly spread by the doctor blade method onto the bonding layer of the composite current collector of Example 2-13 to a wet film thickness of 300 μm and subsequently dried, first at 80° C. for 30 minutes, then at 120° C. for 30 minutes, to form an active material layer on the conductive bonding layer. This was pressure-bonded with a roll press, thereby producing an electrode (film thickness, 120 μm).

Example 3-12

Aside from using the composite current collector of Example 2-14 instead of the composite current collector of Example 2-13, an electrode was produced in the same way as in Example 3-11.

Comparative Example 3-3

Aside from using only aluminum foil (thickness, 20 μm)—that is, a current-collecting substrate—instead of the composite current collector of Example 2-13, an electrode was produced in the same way as in Example 3-11.

[5] Production of Lithium Ion Secondary Batteries and Evaluation of Characteristics

[5-1] Batteries Using Above Electrodes as Positive Electrodes

Example 4-1

The electrode produced in Example 3-1 was die-cut in the shape of a 10 mm diameter disk and the weight was measured, following which the electrode disk was vacuum-dried at 100° C. for 15 hours and then transferred to a glovebox filled with argon. A gasket was placed on a 2032 coin cell (Hohsen Corporation) cap to which a washer and a spacer had been welded, following which a stack of six pieces of lithium foil (Honjo Chemical Corporation; thickness, 0.17 mm) that had been die-cut to a diameter of 14 mm was set thereon, and one piece of separator (Celgard 2400) die-cut to a diameter of 16 mm that had been permeated for at least 24 hours with an electrolyte solution (Kishida Chemical Co., Ltd.; ethylene carbonate:diethyl carbonate=1:1 (volume ratio) solution containing 1 mol/L of the electrolyte lithium hexafluorophosphate) was placed on the foil. The electrode die-cut in the shape of a disk was then placed on top thereof with the active material-coated side facing down. Next, one drop of electrolyte solution was deposited thereon, after which the coin cell case was placed on top and sealing was carried out with a coin cell crimper. The cell was then placed at rest for 24 hours, giving a secondary battery.

Examples 4-2 to 4-9

Aside from using the respective electrodes produced in Examples 3-2 to 3-9 instead of the electrode produced in Example 3-1, secondary batteries were produced in the same way as in Example 4-1.

Comparative Example 4-1

Aside from using the electrode produced in Comparative Example 3-1 instead of the electrode produced in Example 3-1, a secondary battery was produced in the same way as in Example 4-1.

The characteristics of the secondary batteries produced in Examples 4-1 to 4-9 and Comparative Example 4-1 were evaluated. Charge-discharge tests were carried out under the following conditions for the purpose of evaluating the stability of the conductive bonding layer in the positive electrode and the effect of the conductive bonding layer on the cell resistance. Table 2 shows the average voltage (V) and discharge capacity (mAh/g) at a discharge rate of 5 C in the 13th cycle.

Current: 0.5 C constant-current charging, constant-current discharging for 5 cycles each in the order 0.5 C, 3 C, 5 C, 10 C and 0.5 C (the capacity of LFP was set to 170 mAh/g), followed by constant-current discharging at 5 C until the 50th cycle Cut-off voltage: 4.50 V-2.00 V Temperature: room temperature

TABLE 2

| | | Average voltage (V) | Discharge capacity (mAh/g) |
|---|---|---|---|
| Example | 4-1 | 2.6 | 108 |
| | 4-2 | 3.1 | 117 |
| | 4-3 | 3.0 | 114 |
| | 4-4 | 3.1 | 119 |
| | 4-5 | 3.0 | 119 |
| | 4-6 | 3.0 | 111 |
| | 4-7 | 2.9 | 109 |
| | 4-8 | 3.0 | 113 |
| | 4-9 | 2.6 | 101 |
| Comparative Example 4-1 | | 2.2 | 47 |

As shown in Table 2, compared with the battery produced in Comparative Example 4-1, the batteries produced in Examples 4-1 to 4-9 had higher voltages and larger discharge capacities when discharged. This is presumably because, in each of the batteries of the Examples, the conductive bonding layer present between the active material layer and the current collector increased the adhesion therebetween, resulting in a lower interfacial resistance between the active material layer and the current collector.

Moreover, in the batteries produced in Examples 4-1 to 4-9, a large decrease in the discharge capacity was not observed even after 50 cycles. It is apparent from this that a multi-walled CNT layer does not give rise to oxidative decomposition even at a high voltage versus lithium of close to 4.5 V, indicating that electrodes having the conductive bonding layer of this invention can be employed in the positive electrodes of lithium ion secondary batteries. This means that, in applications requiring a large instantaneous current, such as electric vehicle applications in particular, current can be drawn off without causing a voltage drop and, at the same time, energy storage devices having a long cycle life can be produced.

Hence, using the conductive carbon material dispersion of the invention, a conductive thin-film can easily be formed simply by coating the dispersion onto a substrate, in addition to which the resulting conductive thin-film is suitable as a conductive bonding layer for secondary batteries. Moreover, secondary batteries having good characteristics can be obtained by using, as an electrode in the secondary battery, especially as a positive electrode in a lithium ion secondary battery, a secondary battery electrode having such a conductive thin-film as a bonding layer.

[5-2] Batteries Using Above Electrodes as Negative Electrodes

Example 4-10

The electrode produced in Example 3-10 was die-cut as a 10 mm diameter disk and the weight was measured, following which the electrode disk was vacuum-dried at 100° C. for 15 hours and then transferred to a glovebox filled with argon. A gasket was placed on a 2032 coin cell (Hohsen Corporation) cap to which a washer and a spacer had been welded, following which a stack of six pieces of lithium foil (Honjo Chemical Corporation; thickness, 0.17 mm) that had been die-cut to a diameter of 14 mm was set thereon, and one piece of separator (Celgard 2400) die-cut to a diameter of 16 mm that had been permeated for at least 24 hours with an electrolyte solution (Kishida Chemical Co., Ltd.; ethylene carbonate:diethyl carbonate=1:1 (volume ratio) solution containing 1 mol/L of the electrolyte lithium hexafluorophosphate) was placed on the foil. The electrode die-cut in the shape of a disk was then placed on top thereof with the active material-coated side facing down. Next, one drop of electrolyte solution was deposited thereon, after which the coin cell case was placed on top and sealing was carried out with a coin cell crimper. The cell was then placed at rest for 24 hours, giving a secondary battery.

Comparative Example 4-2

Aside from using the electrode produced in Comparative Example 3-2 instead of the electrode produced in Example 3-10, a secondary battery was produced in the same way as in Example 4-10.

The characteristics of the secondary batteries produced in Example 4-10 and Comparative Example 4-2 were evaluated. Charge-discharge tests were carried out under the following conditions for the purpose of evaluating the stability of the conductive bonding layer in the negative electrode and the effect of the conductive bonding layer on the cell resistance. Table 3 shows the discharge in the 30th cycle.

Current: 0.1 C constant-current charging and discharging (constant-current and voltage charging at 0.01 V in first cycle only; the Si capacity was set to 4,200 mAh/g)

Cut-off voltage: 1.50 V-0.01 V

Charging capacity: to 2,000 mAh, based on weight of active material

Temperature: room temperature

TABLE 3

| | Discharge capacity (mAh/g) |
|---|---|
| Example 4-10 | 1,950 |
| Comparative Example 4-2 | 731 |

In the 30$^{th}$ cycle, compared with the battery produced in Comparative Example 4-2 which had a discharge capacity of 731 mAh/g, the battery produced in Example 4-10 retained a high discharge capacity of 1,950 mAh/g.

It was apparent from the above that a secondary battery having good characteristics can be manufactured by employing the conductive bonding layer of the invention in the negative electrode of a lithium ion secondary battery, especially a negative electrode having silicon as the active material.

[6] Production of Electrical Double-Layer Capacitor and Evaluation of Characteristics Example 5-1

Two 10 mm diameter disks were die-cut from the electrode produced in Example 3-11 and their weights were measured, following which they were vacuum-dried at 130° C. for 8 hours and transferred to a glovebox filled with argon. The two electrodes and one separator (TF-40-50, from Nippon Kodoshi Corporation) die-cut to a diameter of 16 mm were immersed in an electrolyte solution (Kishida Chemical Co., Ltd.; propylene carbonate containing 1 mol/L of the electrolyte tetraethylammonium tetrafluoroborate), then vacuum deaerated at 0.05 MPa for 20 minutes. One of the electrodes that had been vacuum-deaerated was set, with the activated carbon-coated surface facing upward, in a 2032 coin cell (Hohsen Corporation) case to which had been welded a washer and a spacer, and a separator was placed on top thereof. The other electrode that had been vacuum-deaerated was then placed on top of the separator, with the activated carbon-coated surface facing downward. Next, three drops of electrolyte solution were deposited thereon, the gasket was placed on top, and a cap to which had been welded a washer and a spacer was placed on top of the gasket, after which sealing was carried out with a coin cell crimper. The cell was then placed at rest for 24 hours, giving a electrical double-layer capacitor.

Example 5-2

Aside from using the electrode produced in Example 3-12 instead of the electrode produced in Example 3-11, an electrical double-layer capacitor was produced in the same way as in Example 5-1.

Comparative Example 5-1

Aside from using the electrode produced in Comparative Example 3-3 instead of the electrode produced in Example 3-11, an electrical double-layer capacitor was produced in the same way as in Example 5-1.

The characteristics of the electrical double-layer capacitors produced in Examples 5-1 and 5-2 and in Comparative Example 5-1 were evaluated. Charge-discharge tests were carried out under the following conditions for the purpose of evaluating the effect of the conductive bonding layer on the cell resistance. Table 4 shows the cell resistance (Q) calculated from the voltage rise in the 31$^{st}$ cycle.

Current: Constant-current charging and discharging at 0.1 mA/cm² for 8 cycles and at 0.2 mA/cm², 0.5 mA/cm², 1.0 mA/cm², 2.0 mA/cm², 4.0 mA/cm² and 8.0 mA/cm² for 5 cycles each in this order, followed by constant-current charging at 0.1 mA/cm², and ending with constant-current, constant-voltage discharging Cut-off voltage: 2.0 V-0 V for the first 3 cycles only, and 2.5 V-0 V thereafter.

Temperature: room temperature

TABLE 4

|  | Cell resistance (Ω) |
|---|---|
| Example 5-1 | 29 |
| Example 5-2 | 27 |
| Comparative Example 5-1 | 35 |

Impedance measurements were carried out under the following conditions for the purpose of evaluating the effect of the conductive bonding layer at the interface between the current collector and the active material. FIG. 1 shows the impedance measurement results.

AC Amplitude: 10 mVrms

Frequency: 200 kHz to 100 mHz

As shown in Table 4 and FIG. 1, the electrical double-layer capacitors produced in Examples 5-1 and 5-2 had a low cell resistance and a low interfacial resistance compared to the electrical double-layer capacitor produced in Comparative Example 5-1. This is presumably because, in the electrical double-layer capacitors of the Examples, the conductive bonding layer present between the active material layer and the current collector increases their adhesion, as a result of which the interfacial resistance between the active material layer and the current collector decreased.

It is apparent from the above results that when the conductive carbon material dispersion of the invention is used, a conductive thin-film can be easily formed simply by coating the dispersion onto a substrate, and moreover that the resulting conductive thin-film is suitable as a conductive bonding layer in electrical double-layer capacitors. Moreover, by using an electrical double-layer capacitor electrode having such a conductive thin-film as the bonding layer, electrical double-layer capacitors endowed with excellent characteristics can be obtained.

The invention claimed is:

1. A dispersion of an electrically conductive carbon material, characterized by comprising:
    a conductive carbon material-dispersing agent consisting of a polymer having a pendant oxazoline group,
    an electrically conductive carbon material; and
    a solvent,
    wherein the conductive carbon material is dispersed in the solvent.

2. The conductive carbon material dispersion of claim 1, wherein the solvent is water.

3. The conductive carbon material dispersion of claim 1 or 2, further comprising a crosslinking agent.

4. The conductive carbon material dispersion of claim 1, further comprising a matrix polymer.

5. An electrically conductive thin-film-forming composition comprising the conductive carbon material dispersion of claim 1.

6. An electrically conductive thin-film obtained from the conductive thin film-forming composition of claim 5.

7. The conductive thin-film of claim 6 for use as an electrically conductive bonding layer that is interposed between, and bonds together, a current-collecting substrate which make up an energy storage device electrode and an active material layer.

8. A composite current collector for an energy storage device electrode, comprising a current-collecting substrate and, formed on the substrate, an electrically conductive bonding layer consisting of the conductive thin-film of claim 6.

9. An electrode for an energy storage device, comprising the composite current collector for an energy storage device electrode of claim 8.

10. The energy storage device electrode of claim 9, comprising the composite current collector for an energy storage device electrode and, formed on the conductive bonding layer of the composite current collector, an active material layer.

11. An energy storage device comprising the energy storage device electrode of claim 9 or 10.

12. A thin-film obtained from the conductive carbon material dispersion of claim 1.

13. A method for dispersing an electrically conductive carbon material by using an electrically conductive carbon material-dispersing agent to disperse an electrically conductive carbon material in a solvent, the method being characterized in that the conductive carbon material-dispersing agent is a polymer having a pendant oxazoline group.

14. A method for producing an electrically conductive carbon material-dispersing agent by using an electrically conductive carbon material dispersant to disperse an electrically conductive carbon material in a solvent, the method being characterized by carrying out dispersion treatment on a mixture obtained by mixing together an electrically conductive carbon material-dispersing agent consisting of a polymer having a pendant oxazoline group, an electrically conductive carbon material and a solvent.

15. The conductive carbon material dispersion of claim 1, wherein the polymer having the pendant oxazoline group is water soluble.

16. The conductive carbon material dispersion of claim 15, wherein the polymer is obtained by radical-polymerizing at least two monomers: an oxazoline monomer having a polymerizable carbon-carbon double bond-containing group at position 2, and a (meth)acrylic monomer having a hydrophilic functional group.

17. The conductive carbon material dispersion of claim 1, wherein the amount of the conductive carbon material-dispersing agent is from 0.001 to 30 wt %.

18. The conductive carbon material dispersion of claim 1, wherein the amount of the electrically conductive carbon material is from 0.0001 to 30 wt %.

19. The conductive carbon material dispersion of claim 1, wherein the solvent is an aqueous solvent.

20. The conductive carbon material dispersion of claim 19, wherein the polymer having a pendant oxazoline group is water-soluble.

* * * * *